US006391132B1

(12) United States Patent
Kinnemann et al.

(10) Patent No.: US 6,391,132 B1
(45) Date of Patent: May 21, 2002

(54) METHOD AND DEVICE FOR LABELING FLAT ITEMS OF POST

(75) Inventors: Georg Kinnemann, Königs Wusterhausen; Christel Gehl, Berlin, both of (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/284,275

(22) PCT Filed: Sep. 30, 1997

(86) PCT No.: PCT/DE97/02252

§ 371 Date: Apr. 12, 1999

§ 102(e) Date: Apr. 12, 1999

(87) PCT Pub. No.: WO98/16904

PCT Pub. Date: Apr. 23, 1998

(30) Foreign Application Priority Data

Oct. 12, 1996 (DE) ........................................ 196 42 110

(51) Int. Cl.[7] ................................................ B32B 31/00

(52) U.S. Cl. ......................... 156/64; 156/256; 156/285; 156/351; 156/354; 156/358; 156/360; 156/378; 156/521; 156/568

(58) Field of Search ................................ 156/358, 360, 156/351, 354, 378, 521, 566, 567, 568, 542, DIG. 2, 64, 256, 285

(56) References Cited

U.S. PATENT DOCUMENTS

| | | | | |
|---|---|---|---|---|
| 3,483,059 A | | 12/1969 | Dinter | 156/364 |
| 3,782,560 A | | 1/1974 | Kahwati et al. | 414/618 |
| 3,883,380 A | | 5/1975 | Kirk et al. | 156/60 |
| 4,544,431 A | | 10/1985 | King | 156/256 |
| 5,122,216 A | | 6/1992 | Goodwin, III | 156/303 |
| 5,224,405 A | * | 7/1993 | Pohjola | 83/24 |
| 5,427,029 A | * | 6/1995 | Dumke | 101/484 |
| 5,922,169 A | * | 7/1999 | Chodacki et al. | 156/521 |
| 6,080,250 A | * | 6/2000 | Urban et al. | 156/64 |

FOREIGN PATENT DOCUMENTS

| | | | |
|---|---|---|---|
| DE | 44 28 242 | | 2/1996 |
| EP | 0 281 064 | | 9/1988 |
| WO | 97/20739 | * | 6/1997 |

* cited by examiner

*Primary Examiner*—Linda Gray
(74) *Attorney, Agent, or Firm*—Venable; George H. Spencer; Robert Kinberg

(57) ABSTRACT

A device and method for labeling flat mail items applies labels to the items by compressed air. The thickness and length of each items is determined in the time for initiating blowing of a respective label is determined as a function of the lengthened thickness of the items and the desired position of the label on the item.

6 Claims, 2 Drawing Sheets

METHOD AND DEVICE FOR LABELING FLAT ITEMS OF POST

BACKGROUND OF THE INVENTION

The invention relates to a method and a device for labeling flat mail items.

A problem associated with the processing of flat mail items, particularly letters, post cards, etc., in mail-routing facilities, is the fast and reliable application of labels to flat mail items. An example of this is automatic mail forwarding. In this case, the mail items are separated out for forwarding addressing, and re-addressed corresponding to predetermined data stored in a database. These items are provided with a label that covers both the old address and, possibly, a barcode applied to the surface of the item. The label is then provided a new barcode and the corresponding, new address. The label is applied in devices that are integrated into automatic letter-sorting facilities. The mail items processed by such sorting facilities vary in format, weight and thickness. In these facilities, the items are conveyed at speeds of, for example, 3.6 m/sec, which places stringent requirements on the speed at which the labels must be applied, as well as the exact positioning of the labels.

A device for contactless label application by means of suction air and compressed air is also known. In this device, the labels are unwound as a strip from a roll by a conveying device, and fed into the region of suction air and compressed air. A pneumatically-driven cutting blade executes a stroke, and a label is cut from the strip. An air nozzle blows the airborne label toward the vacuum chamber, where it remains in a waiting position. An approaching letter is recognized by a light barrier, and the vacuum chamber is switched to compressed air with the aid of a compressed-air valve. The label is then blown onto the surface of the letter. As soon as the label touches the letter surface, it is affixed. The compressed-air blast is selected to be strong enough to press the label firmly against the letter surface. The letter is transported further, and the feeding action of the device is subsequently re-initiated. A further label is then cut and moved into the waiting position (Standard Mobile Label Applicator Model 2111 from LABEL-AIRE).

A disadvantage of this device is that the mail items to be processed are not held securely in the labeling region, and must have the same thickness to assure precise positioning of the labels on the surface of the items.

U.S. Pat. No. 5,122,216 describes a method of applying labels to forms or mail items, in which rollers apply strips of adhesive to labels, which are in turn applied to the forms. Suction air and compressed air hold and apply the labels. With this solution, it is not possible to adapt to different mail-item sizes and label positions.

SUMMARY OF THE INVENTION

It is the object of the present invention to disclose a method and a device for applying labels to flat mail items, which offer precise label positioning on the items, a low susceptibility to breakdowns with a high throughput, and great flexibility in the processed label length.

In accordance with the invention, this object is accomplished by a device and method for labeling flat mail items which applies labels to the items by compressed air. The thickness and length of each item is determined in the time for initiating blowing of a respective label as a function of the length and thickness of the item and the desired position of the label on the item.

A particular advantage of the invention is a high precision in the positioning of the labels on the items, as well as reliable conveyance of the items, despite their varying thicknesses. A notable advantage of the use of carrier-free labels is the absence of waste material.

BRIEF DESCRIPTION OF THE DRAWINGS

The invention is illustrated in detail below in conjunction with drawings. Shown are in.

DETAILED DESCRIPTION OF THE PREFERRED EMBODIMENTS

Figure 1:
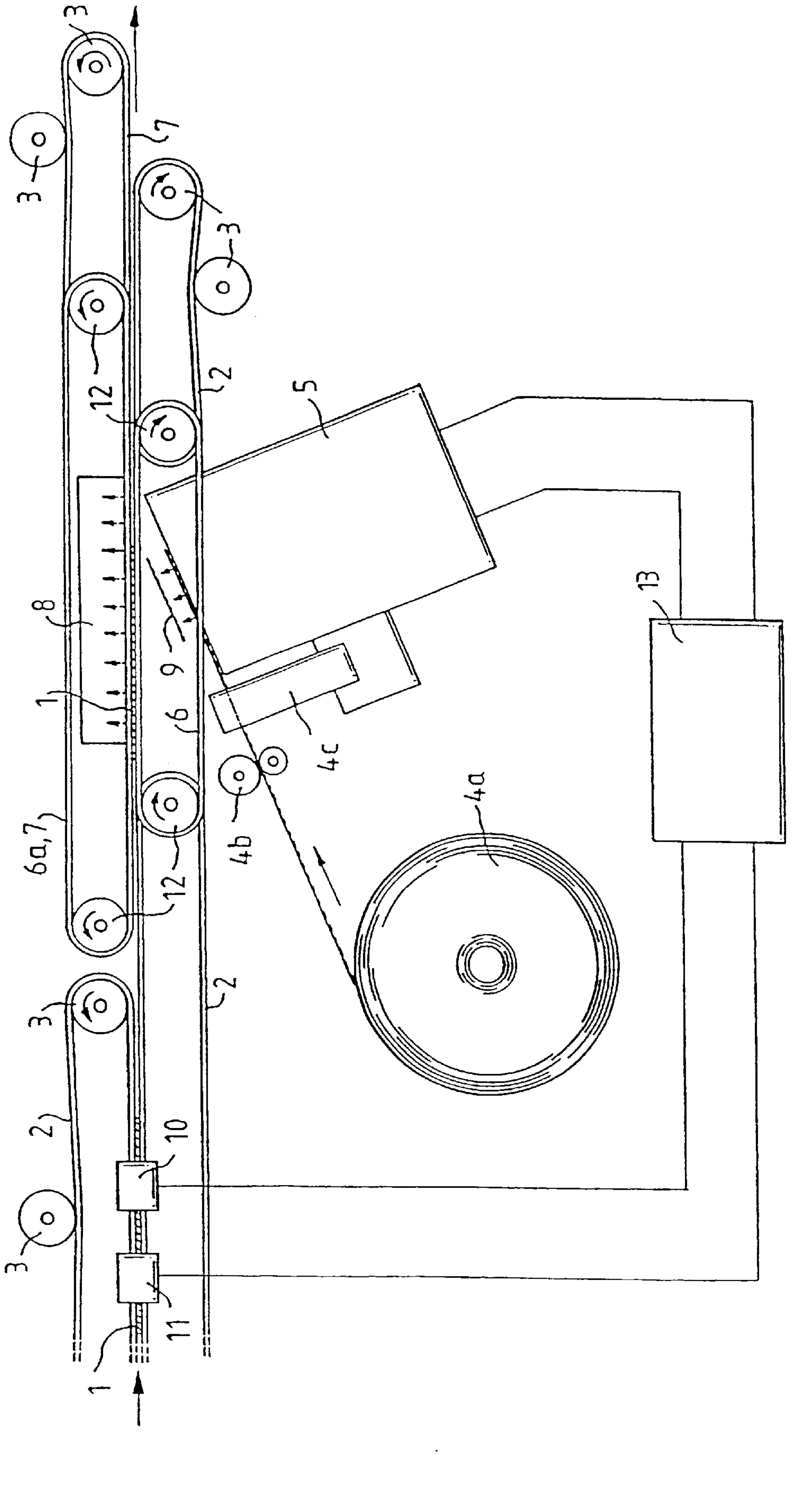
FIG. 1 is a schematic, plan view of a device of the invention.

FIG. 1 shows a schematic, plan view according to a device in which flat mail items 1 are conveyed in a transport path 2. The items 1 are preferably transported by endless belts 2; the endless belts 2 are guided by a system of running rollers 3, and the items 1 are clamped between the endless belts 2. The labels 9 from a label roll 4*a* are applied to the items 1 by a cutting and application station 5. This cutting and application station 5 has a cutting device 4*c*, which cuts the labels 9 unrolled from a label roll 4*a* to the desired length. The label strip is moved and positioned by a label-feeding element 4*b* in a region directly in front of the cutting device 4*c*. The cutting and application station 5 also has suction-air and compressed-air chambers for bringing the labels into a waiting position and subsequently applying them to the surface of the flat mail items 1. The adhesive side of the labels 9 faces the mail items 1, and the non-adhesive side faces the openings of the suction-air and compressed-air chambers. In accordance with the invention, the items 1 are positioned by suction air in the label region. To this end, the items 1 are guided, standing on a longitudinal edge, past a suction trough 8 having a perforated suction belt 7. Transport and holding belts 6, 6*a* stabilize the items 1 by holding their upper part in a frictional engagement, so the labeling zone of the items remains exposed. The perforated suction belts 7 permit the vacuum generated by the suction trough 8 to reach the items 1, so they are pressed, with the endless belts 2, against the surface of the suction trough 8.

Figure 2:
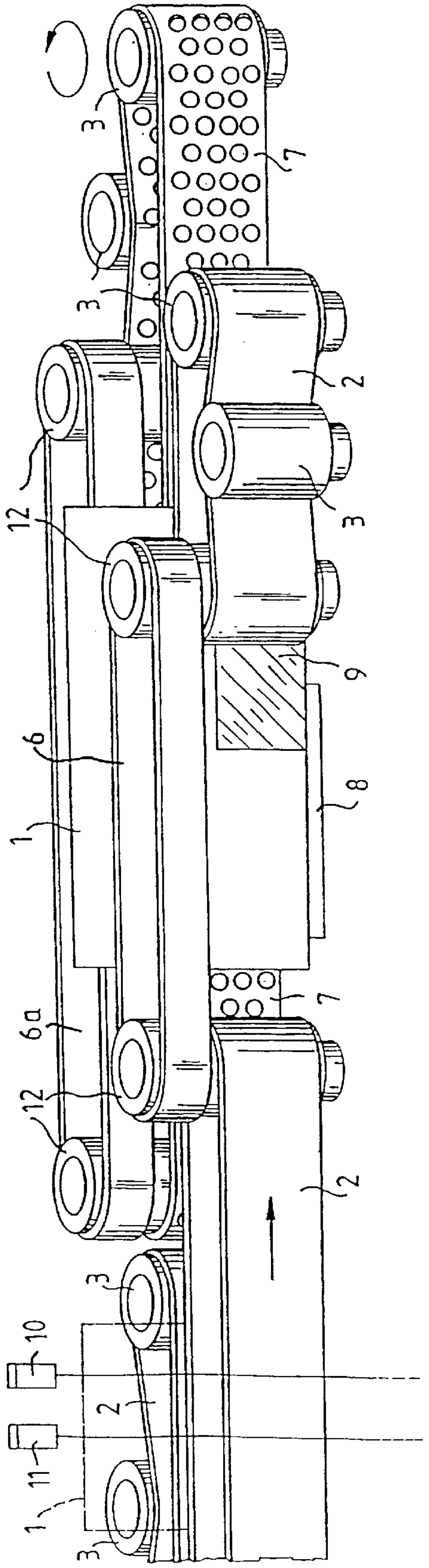
FIG. 2 is a side view in perspective of the transport path in a device of the invention.

As shown in FIG. 2, in the labeling region, the items are guided, preferably in their upper region, by narrow transport and holding belts 6, 6*a*, the belts being guided via (double) running rollers 12.

A length sensor 10 and a thickness sensor 11 are disposed upstream of the mail items, in front of the labeling region. A light barrier is preferably provided as a length sensor 10.

The length sensor 10 measures the length of each passing item, and announces the measurement result to a control unit 13. From this information, the control unit 13 determines the necessary label length and correspondingly controls the label-feeding element 4*b* and the cutting device 4*c*. The thickness sensor 11 ascertains the thickness of each item, and likewise sends this information to the control unit 13. The control unit 13 accordingly calculates the time at which the label is to be blown onto the passing item 1.

The evaluation of the length and thickness measurements of the mail item 1 permits the label 9 to be advanced as a function of the measured length and thickness of the item 1. As soon as the front edge of the item 1 has broken the light barrier, the control unit 13 determines the time at which the front edge has reached a specified point of the labeling region. This is a crucial parameter for blowing the cut label 9 from the waiting position at the front side of the cutting and application station 5 onto the passing item 1. A further parameter factored into the determination of the blowing time is the measured thickness of the item 1, because the item thickness impacts the flight path and flight time of the label 9 blown by the cutting and application station 5 onto the surface of the item 1. The invention particularly permits the variable selection of the label length according to item length, as well as a high positioning precision. Thus, it is possible to label mail items of varying thicknesses and formats at a defined distance from the front edge of the item. In particular, the labels 9 can be carrier-free and variable in length.

We claim:

1. A method of labeling flat mail items, which are transported standing vertically on their lower edge past a cutting and application station for labels, in which the labels are applied to the items by means of compressed air, comprising the steps of:

determining the thickness and length of each item guided past the cutting and application station with its rear side having a fixed spatial orientation and spacing from the cutting and application station;

determining a time for initiating the blowing of a respective label as a function of at least the desired label position on the item and the determined thickness of the item; and initiating the blowing in accordance with the determined time in order to apply the label to the item as the item passes the cutting and application station.

2. The method according to claim 1, wherein, the items are guided on their rear side by means of suction air.

3. The method according to claim 1, further comprising the step of selecting a label length based on the determined item length, and wherein the initiation time for blowing is determined as a function additionally of the label length selected.

4. A device for labeling flat mail items comprising:

a transport path having transport belts and holding belts, between which the items are clamped and transported, standing on their lower edge;

a cutting and application station for labels in which the labels are applied to the items by means of compressed air as the items pass the cutting and application station;

length and thickness sensors for measuring the length and thickness of each item guided past the cutting and application station with a fixed spatial orientation and spacing from the cutting and application station; and a control unit for determining the initiation time of the blowing of the respective label by the cutting and application station as a function of the signals of the sensors and the desired position of the label on the item.

5. The device according to claim 4, wherein the transport belts and holding belts leave the labeling zone exposed in the labeling region, and a suction belt is provided in front of a suction trough for transporting the items by their rear side, the suction belt being moved at the same speed as the transport and holding belts.

6. The device according to claim 4, wherein the control unit further selects a label length based on the determined item length, and determines the initiation time of the blowing as a function additionally of the label length selected.

* * * * *